US009208687B2

(12) United States Patent
Wang et al.

(10) Patent No.: US 9,208,687 B2
(45) Date of Patent: Dec. 8, 2015

(54) SYSTEM AND METHOD FOR SOCIAL NETWORKING OF AIRCRAFT FOR INFORMATION EXCHANGE

(71) Applicant: RAYTHEON CANADA LIMITED, OTTAWA (CA)

(72) Inventors: Jian Wang, Waterloo (CA); Yuchoi F. Lok, Framingham, MA (US); Anthony M. Ponsford, Ottawa (CA); Oliver H. Hubbard, Waterloo (CA); Eli Brookner, Lexington, MA (US); Robert W. Bowne, Omaha, NE (US)

(73) Assignee: Raytheon Canada Limited, Ottawa, Ontario (CA)

( * ) Notice: Subject to any disclaimer, the term of this patent is extended or adjusted under 35 U.S.C. 154(b) by 317 days.

(21) Appl. No.: 13/742,249

(22) Filed: Jan. 15, 2013

(65) Prior Publication Data

US 2014/0197982 A1 Jul. 17, 2014

(51) Int. Cl.
*G01S 13/76* (2006.01)
*G08G 5/00* (2006.01)
*G01S 7/00* (2006.01)

(52) U.S. Cl.
CPC ............... *G08G 5/0008* (2013.01); *G01S 7/003* (2013.01); *G01S 2205/002* (2013.01)

(58) Field of Classification Search
CPC .. G01S 2205/002; G01S 7/003; G08G 5/0008
USPC .......................................................... 342/37
See application file for complete search history.

(56) References Cited

U.S. PATENT DOCUMENTS

| | | | |
|---|---|---|---|
| 6,501,392 B2 | 12/2002 | Gremmert et al. | |
| 6,810,310 B1 * | 10/2004 | McBain | 701/3 |
| 6,977,608 B1 * | 12/2005 | Anderson et al. | G01C 21/16 340/945 |
| 7,414,567 B2 | 8/2008 | Zhang et al. | |
| 7,519,014 B2 | 4/2009 | Allen et al. | |
| 7,633,428 B1 * | 12/2009 | McCusker et al. | 342/26 B |
| 8,040,258 B2 | 10/2011 | Ibrahim et al. | |
| 8,130,135 B2 | 3/2012 | Donovan | |
| 8,217,828 B2 | 7/2012 | Kirk | |
| 2010/0283661 A1 * | 11/2010 | Strain et al. | 342/30 |
| 2012/0214420 A1 | 8/2012 | O'Connor et al. | |
| 2014/0236469 A1 * | 8/2014 | Callan et al. | G08G 5/045 701/301 |

OTHER PUBLICATIONS

Griner, James H. Jr., "Flight Test of Weather Data Exchange Using the 1090 Extended Squitter (1090ES) and VDL Mode 3 Data Links", NASA John H. Glenn Research Center. (31 pages).

* cited by examiner

*Primary Examiner* — Timothy A Brainard
(74) *Attorney, Agent, or Firm* — Christie, Parker & Hale, LLP

(57) ABSTRACT

A system and method for exchanging information between aircraft (210). Sensors on a first aircraft (210) provide data about the first aircraft's environment, including hazards such as turbulence, icing, lightning, or birds. The system transmits the data to receiving systems in other aircraft (210), which display the data, to warn the pilots flying the other aircraft of potential hazards. The pilot of the first aircraft may supplement the information with visual observations, about birds or unmanned aerial vehicles, for example. In one embodiment, the information is transmitted from aircraft to aircraft over a data link using ADS-B. In another embodiment, a first aircraft may transmit data to a second aircraft, which may relay, or re-transmit, the data to a third aircraft.

18 Claims, 3 Drawing Sheets

SYSTEM AND METHOD FOR SOCIAL NETWORKING OF AIRCRAFT FOR INFORMATION EXCHANGE

BACKGROUND

1. Field

One or more aspects of embodiments according to the present invention relate to communication of information between aircraft, and particularly to the sharing of information about potential flight hazards between aircraft using a variety of data links.

2. Description of Related Art

Pilots of aircraft flying near hazards have a need to be informed of the nature and location of those hazards, but existing systems are not optimal for communicating such information to pilots. Adverse weather conditions, such as turbulence and icing conditions, may not be reliably detected by ground systems. Similarly, flocks of birds, which may present a hazard to aircraft, may not be reliably detected by ground systems, especially when they are at some distance from a ground station.

Pilots of other nearby aircraft may on occasion be aware of hazards, and sensors on other aircraft may provide alerts about local conditions such as turbulence, but it may be impractical for a pilot on an aircraft to relay warnings to other aircraft entering the area, especially while flying in or near a hazard.

Thus, there is a need for an improved system for providing data, including, information related to hazards, to pilots of aircraft.

SUMMARY

It is desirable to share information related to the flight environment between aircraft, especially when the environment contains important hazards. A system for sharing such information may include a plurality of sensors on an aircraft, monitoring the environment for icing, turbulence, lightning, and the like, and automatically transmitting the information via ADS-B links, or other transmission mechanisms, such as other self organizing mesh networks, to other aircraft. Related systems on other aircraft may then display the information, or hazard warnings, to the pilots flying the other aircraft. Critical information can be further relayed into other aircraft.

According to an embodiment of the present invention there is provided a system for exchanging information between aircraft, including an on-board system having: a sensor; a transmitter; a receiver; and a controller; wherein the controller is configured to control the transmitter and the receiver to: automatically transmit sensor data obtained from the sensor; automatically receive data; and display data received by the receiver, and wherein the transmitter, the receiver, and the controller are configured to participate in a self organizing mesh network.

In one embodiment, the transmitter is configured to transmit data according to an automatic dependent surveillance-broadcast (ADS-B) standard, and the receiver is configured to receive data according to an ADS-B standard.

In one embodiment, the transmitter is configured to transmit data according to an ADS-B Universal Access Transceiver (ADS-B UAT) standard and the receiver is configured to receive data according to an ADS-B UAT standard.

In one embodiment, the transmitter is configured to transmit data according to an ADS-B 1090 Extended Squitter (ADS-B 1090ES) standard and the receiver is configured to receive data according to an ADS-B 1090ES standard.

In one embodiment, the sensor is a sensor selected from the group consisting of: icing sensors, wind speed sensors, wind direction sensors, precipitation sensors, lightning sensors, radar sensors, Global Positioning System sensors, and combinations thereof.

In one embodiment, the system includes an input device configured to receive data from a pilot regarding local hazards, wherein the controller is configured to control the transmitter to automatically transmit the data received from the pilot by the input device.

In one embodiment, the controller, the transmitter, and the receiver are further configured to re-transmit data received by the receiver.

In one embodiment, a system of connected aircraft includes a first aircraft equipped with a first system for communication between aircraft; and a second aircraft equipped with a second system for communication between aircraft.

In one embodiment, the system includes a ground station, the ground station including: a connection to a source of data; a transmitter; and a controller; wherein the controller is configured to control the transmitter to automatically transmit data obtained from the source of data.

In one embodiment, the system includes a satellite, the satellite including: a sensor; a transmitter; and a controller; wherein the controller is configured to control the transmitter to transmit data obtained from the sensor.

According to an embodiment of the present invention there is provided a method for communicating between aircraft, including automatically: obtaining first sensor data from sensors on a first aircraft; transmitting the first sensor data; receiving second data transmitted by a second aircraft; and displaying the second data wherein the transmitting of the first sensor data and the receiving of the second data transmitted by a second aircraft include using a self organizing mesh network to communicate with other aircraft.

In one embodiment, the transmitting of the first sensor data includes transmitting the first sensor data according to an ADS-B standard; and the receiving of the data transmitted by a second aircraft includes receiving data according to an ADS-B standard.

In one embodiment, the transmitting of the first sensor data includes transmitting the first sensor data according to an ADS-B UAT standard; and the receiving of the data transmitted by a second aircraft includes receiving data according to an ADS-B UAT standard.

In one embodiment, the transmitting of the first sensor data includes transmitting the first sensor data according to an ADS-B 1090ES standard; and the receiving of the data transmitted by a second aircraft includes receiving data according to an ADS-B 1090ES standard.

In one embodiment, the sensors on the first aircraft include a sensor selected from the group consisting of: icing sensors, wind speed sensors, wind direction sensors, precipitation sensors, lightning sensors, radar sensors, Global Positioning System sensors, and combinations thereof.

In one embodiment, the method includes receiving data regarding local hazards from a pilot and automatically transmitting the data regarding local hazards.

In one embodiment, the method includes automatically: obtaining second sensor data from sensors on the second aircraft; and transmitting the second sensor data; wherein the second data includes the second sensor data.

In one embodiment, the method includes re-transmitting the second data.

BRIEF DESCRIPTION OF THE DRAWINGS

Features, aspects, and embodiments are described in conjunction with the attached drawings, in which.

DETAILED DESCRIPTION

The detailed description set forth below in connection with the appended drawings is intended as a description of exemplary embodiments of a system and method for social networking of aircraft for information exchange provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

According to an embodiment of the present invention, a network, which may also be referred to as a social network, may be set up, allowing aircraft to communicate directly, exchanging information automatically about hazards or local weather conditions. Such a system avoids the need for air traffic control to be involved in the exchange of information, and pilot participation is not required.

In the absence of such a system, a pilot who wishes to warn other nearby aircraft about a hazard may need to contact air traffic control, and request that air traffic control notify other aircraft about the hazard. This may compromise the pilot's ability to deal with the hazard, and it may strain the resources of an air traffic control center. In some cases, there may be no air traffic control center available to relay the warning to other aircraft. Thus, as used herein, the term "automatically" means without requiring pilot or air traffic controller participation.

Figure 1:
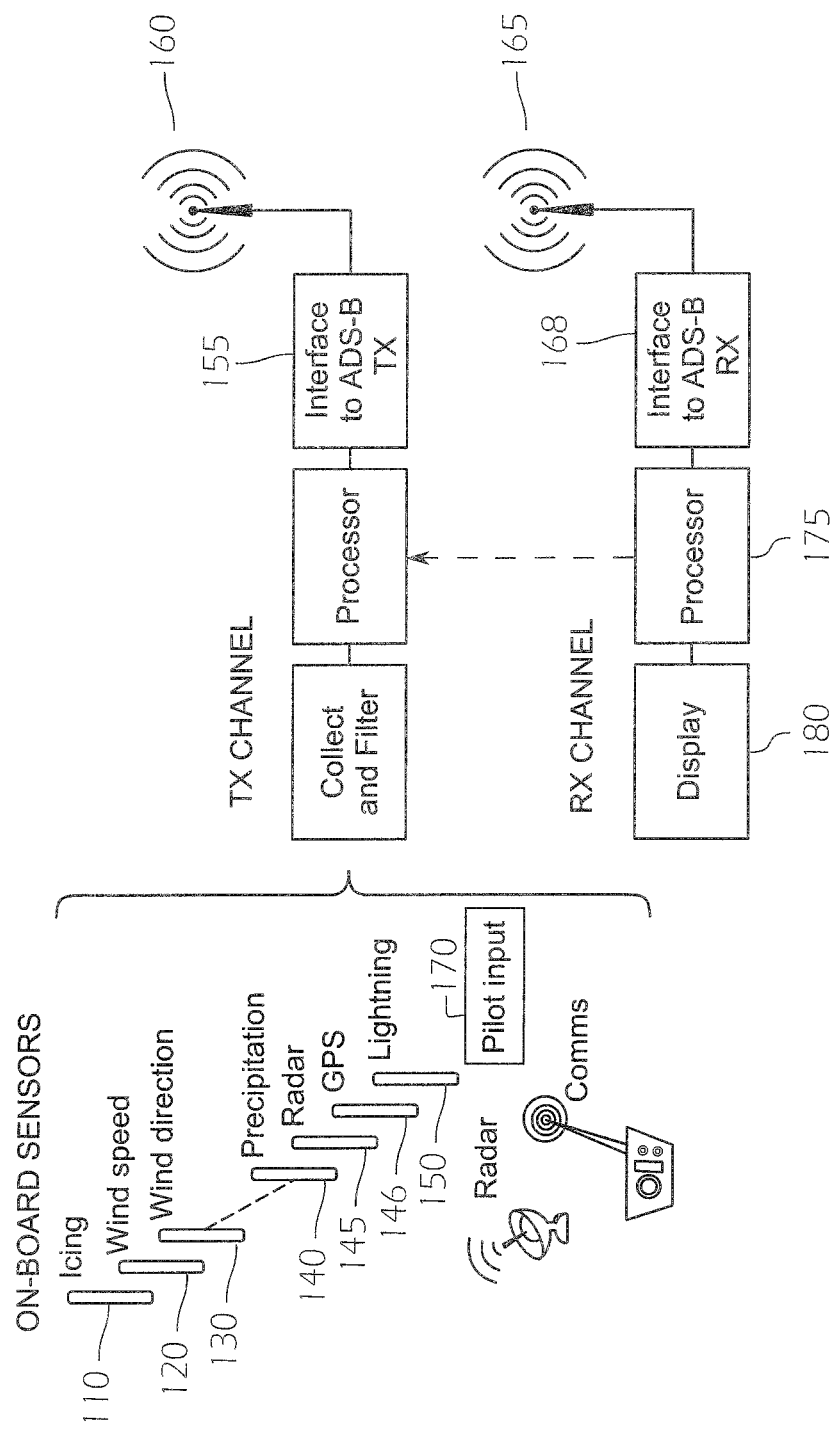
FIG. 1 is a schematic block diagram of a sensing and networking system employed in an aircraft according to an embodiment of the present invention.

Referring to FIG. 1, in one embodiment, multiple sensors on board an aircraft 210 (FIG. 2) may monitor the aircraft's environment. Such sensors may include icing sensors 110, wind speed sensors 120, wind direction sensors 130, precipitation sensors 140, lightning sensors 150, aircraft radar 145, Global Positioning System (GPS) sensors 146, and the like. Here, a GPS sensor may be a GPS receiver employed to sense, for example, the aircraft's position and velocity. In a transmit channel, the sensor data may be collected and filtered, processed, and then sent to a transmitter interface 155 and to a transmitter 160 for broadcast to nearby aircraft. Filtering and processing may involve averaging to improve the signal to noise ratio (SNR) of the sensor measurements, or it may include combining multiple sensor measurements to form derived quantities, for example inferring the absolute wind from wind speed sensors and the aircraft's ground speed and direction, or it may include analyzing and selecting critical information. In one embodiment, the system may identify potential hazards, such as a warning from an icing sensor indicating that the icing risk is approaching a threshold, or variations in wind speed or aircraft accelerations indicating turbulence, or indications of the presence of unmanned aerial vehicles (UAVs) or flocks of birds. These determinations may be transmitted as hazard warnings. In another embodiment, the data on which such determinations were based may be transmitted instead of, or in addition to, hazard warnings, allowing pilots or processing systems on other aircraft to make the determination of whether the measured conditions are hazardous.

In one embodiment, pilot input 170 may be treated like one or more additional sensors. For example, the pilot may have an input device that may be used to signal the presence and location of a flock of birds, or an unmanned aerial vehicle (UAV) to the system; this may then be transmitted as a hazard warning or, for example, as an observation that a flock of birds was sighted at a particular location. When the pilot does not participate the system may continue to transmit automatically, e.g., autonomously, providing information or warnings to other aircraft nearby. This feature may be especially helpful when one aircraft 210 encounters a hazard, such as severe turbulence, and the pilot is occupied handling the emergency and, as a result, unable to warn other pilots; in this situation the automated operation of the system and method for social networking of aircraft for information exchange may continue to warn other aircraft 210 about the hazard. Moreover, an automated system may transmit critical information and hazard warnings more quickly and accurately than a human pilot.

The receive channel may include a receiver 165, a receiver interface 168, a receive channel processor 175, and a display 180. The transmitter and receiver may form a data link between aircraft. The processor 175 may combine data received from aircraft at other locations, merging them if the other aircraft are sufficiently close to each other for their environments to be correlated, and it may then display this information to the pilot in a readily comprehensible format. For example the system may display a map showing the aircraft's planned flight path and any hazards on or near the path using different symbols to identify the different hazards, such as lightning, icing, turbulence, or birds. In one embodiment, the receive channel processor may compare objective sensor readings from other aircraft to thresholds maintained by the receive channel processor, and display as a hazard any reading exceeding the corresponding threshold. In one embodiment, the thresholds may be set by the pilot, who may, for example, want to be warned when turbulence experienced by other aircraft exceeds a certain threshold. The sensors, the transmitter, the receiver, and the processors, which together may be considered to form a controller, may form an on-board system, i.e., these components may be installed on board an aircraft.

In one embodiment, the data link used to exchange data between aircraft 210 may be a self organizing mesh network, such as, for example, automatic dependent surveillance-broadcast (ADS-B). In this embodiment the cost of implementing the data link, and therefore the cost of implementing the system, may be significantly reduced if the aircraft is under construction and being equipped with an ADS-B system, or if the aircraft is being retrofitted with an ADS-B system for other reasons. Such reasons may include regulations mandating the installation of ADS-B in new aircraft. The ADS-B standard requires that certain information be transmitted by each aircraft, including, for example, position, speed, and altitude, but other bytes within an ADS-B message may be used for other purposes, such as the data to be exchanged according to the present invention.

The ADS-B standard includes two components, referred to as ADS-B IN, and ADS-B OUT, corresponding to an aircraft's ability to receive and send ADS-B data, respectively. Some aircraft may be equipped only with one component of ADS-B; ADS-B OUT may become mandatory, for example, while ADS-B IN may remain optional. In such a case, the aircraft may still participate in the network as a transmitter or receiver only. Aircraft may also relay information obtained from other aircraft by simply re-transmitting some or all of the data received, as indicated by the dashed line in FIG. 1, which may allow warnings or other data to be transmitted over greater distances, and provide sufficient advance warning, for example, for a pilot to modify her flight plan en route.

Figure 2:
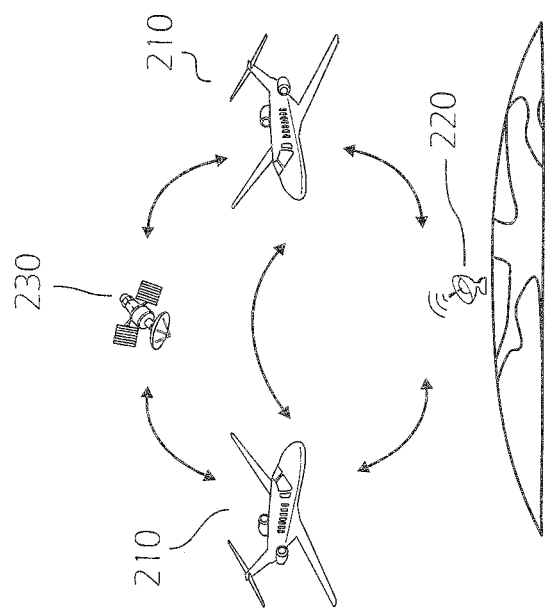
FIG. 2 is a perspective diagram of aircraft, a ground station, and a satellite participating in networked communications according to an embodiment of the present invention.

Referring to FIG. 2, ground stations 220 may also participate in the system, transmitting data obtained on the ground, e.g., from weather satellites or from ground observations, or relaying information transmitted by other aircraft. In one embodiment, weather data transmitted between aircraft may conform to the standards of a 4-dimensional weather data cube.

ADS-B may be implemented at two carrier frequencies: at 978 MHz (referred to as ADS-B Universal Access Transceiver or ADS-B UAT) or at 1090 MHz (referred to as ADS-B 1090 Extended Squitter or ADS-B 1090ES). ADS-B UAT has considerably higher data rates available, and may enable the system to provide detailed information not readily provided if ADS-B 1090ES is used. An ADS-B UAT may, in particular, be useful if a ground station 220 participates in the network. In such an embodiment, the ground station may have a full weather map showing weather information over a region, and containing a quantity of information best transmitted over a high data capacity link such as ADS-B UAT.

In one embodiment, the system may provide a range of types of information to aircraft, some provided by ground stations, and some by aircraft. In some embodiments, aircraft may also receive information directly from satellites 230, using, for example, XM satellite radio. The types of information may include, for example, lightning information, satellite imagery METARs (observations), winds aloft, freezing level, UAT weather, including Flight Information Service-Broadcast (FIS-B) and Traffic Information Service-Broadcast (TIS-B). FIS-B Weather may, in turn, include Airman's Meteorological Information (AIRMETs), Significant Meteorological information (SIGMETs), Meteorological Terminal Aviation Routine Weather Report (METAR), SPECI updates, National NEXRAD, Mosaic Regional NEXRAD, Diurnal Time Notice to Airmen (D-NOTAMS), Flight Data Center NOTAMS (FDC-NOTAMS), Pilot Reports (PIREPs), special use airspace status, Terminal Aerodrome Forecasts (TAFs), AMENDS updates, and winds aloft. Critical information is then analyzed and where appropriate, for example when relevant for the safety of aircraft, re-transmitted to other aircraft in the vicinity that may not have the necessary equipment to receive the source data directly.

Figure 3:
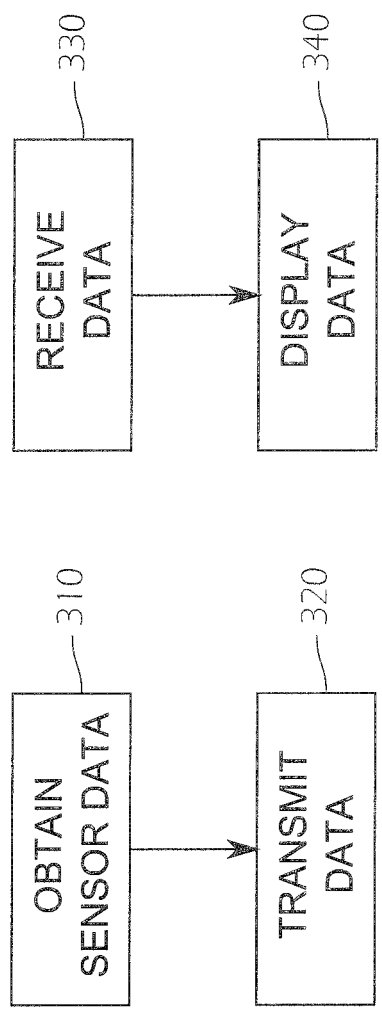
FIG. 3 is a flow chart showing acts involved in executing communications according to an embodiment of the present invention.

Referring to FIG. 3, the acts involved in practicing an embodiment of the present invention include, obtaining sensor data in an act 310, transmitting the sensor data in an act 320, receiving data in an act 330, and, displaying the data in an act 340. The pair of acts 310 and 320 may be executed repeatedly, as may the pair of acts 330 and 340. These pairs need not be executed in a synchronized fashion or at the same rate, and in some embodiments only the pair of acts 310 and 320, or the pair of acts 330 and 340, may be executed.

Although limited embodiments of a system and method for social networking of aircraft for information exchange have been specifically described and illustrated herein, many modifications and variations will be apparent to those skilled in the art. Accordingly, it is to be understood that the system and method for social networking of aircraft for information exchange employed according to principles of this invention may be embodied other than as specifically described herein. The invention is also defined in the following claims, and equivalents thereof.

What is claimed is:

1. A system for exchanging information between aircraft, comprising:
    an on-board system having:
        a first sensor;
        a second sensor;
        a transmitter;
        a receiver; and
        a controller;
    wherein the controller is configured to control the transmitter and the receiver to:
        combine data from the first sensor and the second sensor to form a derived quantity;
        automatically transmit the derived quantity and sensor data obtained from the first sensor;
        automatically receive data; and
        display data received by the receiver, and
    wherein the transmitter, the receiver, and the controller are configured to participate in a self organizing mesh network,
    the on-board system further comprising an input device configured to receive data from a pilot regarding the presence of birds or unmanned aerial vehicles,
    wherein the controller is further configured to:
        combine the data from the first sensor, the second sensor, and the input device, and
        send the combined data to a transmitter interface.

2. The system of claim 1, wherein the transmitter is configured to transmit data according to an automatic dependent surveillance-broadcast (ADS-B) standard, and the receiver is configured to receive data according to an ADS-B standard.

3. The system of claim 2, wherein the transmitter is configured to transmit data according to an ADS-B Universal Access Transceiver (ADS-B UAT) standard and the receiver is configured to receive data according to an ADS-B UAT standard.

4. The system of claim 2, wherein the transmitter is configured to transmit data according to an ADS-B 1090 Extended Squitter (ADS-B 1090ES) standard and the receiver is configured to receive data according to an ADS-B 1090ES standard.

5. The system of claim 1, wherein the first sensor is a sensor selected from the group consisting of: icing sensors, wind speed sensors, wind direction sensors, precipitation sensors, lightning sensors, radar sensors, Global Positioning System sensors, and combinations thereof.

6. The system of claim 1, wherein the controller, the transmitter, and the receiver are further configured to re-transmit data received by the receiver.

7. A system of connected aircraft, comprising:
    a first aircraft equipped with a first system of claim 1; and
    a second aircraft equipped with a second system of claim 1.

8. The system of claim 7, further comprising a ground station, the ground station comprising:
    a connection to a source of data;
    a transmitter; and
    a controller;
    wherein the controller is configured to control the transmitter to automatically transmit data obtained from the source of data.

9. The system of claim 7, further comprising a satellite, the satellite comprising:
    a sensor;
    a transmitter; and
    a controller;
    wherein the controller is configured to control the transmitter to transmit data obtained from the sensor.

10. A method for communicating between aircraft, comprising automatically:
obtaining first sensor data from sensors on a first aircraft, the first sensor data comprising data from a first sensor and data from a second sensor;
combining the data from the first sensor and the data from the second sensor to form a derived quantity;
transmitting the first sensor data and the derived quantity;
receiving second data transmitted by a second aircraft; and
displaying the second data,
wherein the transmitting of the first sensor data and the receiving of the second data transmitted by a second aircraft comprise using a self organizing mesh network to communicate with other aircraft,
the method further comprising receiving, through an input device, input regarding the presence of birds or unmanned aerial vehicles from a pilot of the first aircraft,
combining the data from the first sensor, the second sensor, and the input device, and
sending the combined data to a transmitter interface.

11. The method of claim 10, wherein:
the transmitting of the first sensor data comprises transmitting the first sensor data according to an ADS-B standard;, and
the receiving of the data transmitted by a second aircraft comprises receiving data according to an ADS-B standard.

12. The method of claim 11, wherein:
the transmitting of the first sensor data comprises transmitting the first sensor data according to an ADS-B UAT standard; and
the receiving of the data transmitted by a second aircraft comprises receiving data according to an ADS-B UAT standard.

13. The method of claim 11, wherein:
the transmitting of the first sensor data comprises transmitting the first sensor data according to an ADS-B 1090ES standard; and
the receiving of the data transmitted by a second aircraft comprises receiving data according to an ADS-B 1090ES standard.

14. The method of claim 10, wherein the sensors on the first aircraft include a sensor selected from the group consisting of icing sensors, wind speed sensors, wind direction sensors, precipitation sensors, lightning sensors, radar sensors, Global Positioning System sensors, and combinations thereof.

15. The method of claim 10, further comprising receiving data regarding local hazards from a pilot and automatically transmitting the data regarding local hazards.

16. The method of claim 10, further comprising automatically:
obtaining second sensor data from sensors on the second aircraft; and
transmitting the second sensor data;
wherein the second data comprises the second sensor data.

17. The method of claim 10, further comprising re-transmitting the second data.

18. The method of claim 10, comprising:
receiving, by the first aircraft:
lightning information,
satellite imagery,
Meteorological Terminal Aviation Routine Weather Reports,
information regarding winds aloft,
information regarding a freezing level,
UAT weather information,
Flight Information Service-Broadcast information,
Traffic Information Service-Broadcast information,
Airman's Meteorological Information,
Significant Meteorological information,
SPECI updates,
National NEXRAD information,
Mosaic Regional NEXRAD information,
Diurnal Time Notice to Airmen,
Flight Data Center Notices to Airmen,
Pilot Reports,
special use airspace status, and
Terminal Aerodrome Forecasts,
analyzing the received information, and
re-transmitting the received information to the second aircraft.

* * * * *